United States Patent
Herrmann

(10) Patent No.: US 6,723,015 B2
(45) Date of Patent: Apr. 20, 2004

(54) SLIDING LINK BELT

(75) Inventor: Michael Herrmann, Lebach (DE)

(73) Assignee: ZF Batavia L.L.C., Batavia, OH (US)

(*) Notice: Subject to any disclaimer, the term of this patent is extended or adjusted under 35 U.S.C. 154(b) by 30 days.

(21) Appl. No.: 10/136,808

(22) Filed: May 1, 2002

(65) Prior Publication Data

US 2002/0183151 A1 Dec. 5, 2002

(30) Foreign Application Priority Data

May 3, 2001 (DE) .......................................... 101 21 633

(51) Int. Cl.[7] ................................................. F16G 1/00
(52) U.S. Cl. ..................... 474/201; 474/100; 474/145
(58) Field of Search ............................... 474/144, 145, 474/146, 100, 201, 242, 243, 244

(56) References Cited

U.S. PATENT DOCUMENTS

| 2,578,012 A | * | 12/1951 | McGihon | 474/40 |
| 4,604,082 A | * | 8/1986 | Hattori | 474/242 |
| 4,618,337 A | * | 10/1986 | Okawa et al. | 474/201 |
| 4,655,733 A | | 4/1987 | Jonason | 474/242 |
| 5,123,880 A | * | 6/1992 | Sekine et al. | 474/244 |
| 2002/0115513 A1 | * | 8/2002 | Yuan | 474/201 |

FOREIGN PATENT DOCUMENTS

| DE | 2 116 930 | 11/1971 | F16G/5/18 |
| DE | 35 35 381 A1 | 4/1986 | B60K/17/08 |
| DE | 34 29 122 C2 | 12/1987 | F16H/9/24 |
| DE | 42 30 605 C1 | 8/1993 | F16H/9/24 |
| DE | 296 00 528 U1 | 4/1996 | F16C/33/50 |
| GB | 1 286 777 | 8/1972 | F16G/5/20 |
| WO | 97/25552 | 7/1997 | F16G/5/16 |

\* cited by examiner

*Primary Examiner*—Thomas R. Hannon
(74) *Attorney, Agent, or Firm*—Davis & Bujold PLLC

(57) ABSTRACT

The link belt for power transmission for a continuously variable transmission, with individual links (2) and a ring package (3, 5), which holds the links (2) together, contains an additional, outer ring package (4) for the purpose of absorbing the radial forces generated on the links (2) is provided, which is arranged around the link belt (1) and is mounted such that it can no longer rotate along with the link belt (1), however is still able to follow the strip's adjusting movement, wherein the ring package (5) ensures that the links are guided and held together.

10 Claims, 3 Drawing Sheets

SLIDING LINK BELT

FIELD OF THE INVENTION

The present invention relates to a link belt for the power transmission for a continuously variable automatic transmission (CVT).

BACKGROUND OF THE INVENTION

A continuously variable transmission consists generally of e.g., a starting unit, a forward/reverse driving unit, an intermediate shaft, a differential, hydraulic and electronic control devices as well as a variator.

According to the state of the art, the variator comprises a primary and a secondary pulley, also called primary and secondary sides, wherein these pulleys are formed by cone pulleys that are arranged in pairs. Furthermore a variator is equipped with a torque-transmitting continuously variable element, which runs between the two cone pulley sets.

In such a transmission, the current gear ratio is defined by the running radius of the continuously variable element, which in turn is a function of the axial position of the cone pulleys.

A continuously variable element, in particular for higher power engines, consists according to the state of the art of individual links, which serve the actual power transmission, and of so-called ring packages. Such link belts consist of a plurality of individual metal elements, which are mated and which are held on both sides of the radial plane of the finished link belt by one flexible ring package each.

These ring packages can consist of high-strength stainless steel and advantageously contain nine to twelve rings that are arranged concentrically to each other.

The ring packages hold the individual links together and therefore must absorb considerable forces, in particular with small radii, which the strip must handle at certain gear ratios.

The forces increase with the torque that is to be transmitted. The transmission capacity of a link belt currently lies around 300 Nm.

During operation, the ring packages are exposed to constant bending stress: With one revolution of the link belt around the variator the strip, transitions from a straight movement into a radius movement around the primary pulley, subsequently again into a straight movement and then into a radius movement around the secondary pulley. This constant variation of the bending radius sets a limit on the reinforcement of the ring packages, which therefore cannot be reinforced indefinitely.

For this reason it is not possible to reinforce the ring packages without simultaneously increasing the rigidity of the entire link belt, which in turn during operation increases the smallest possible running radii and the friction losses unfavorably.

SUMMARY OF THE INVENTION

The present invention is based on the task of presenting a link belt, which can transmit more torque without impairment of its flexibility.

Furthermore, power loss is to be reduced.

Accordingly, separating absorption of the radial forces generated on the links from the actual "guidance" of the links is proposed.

Similar to the link belt known from the state of the art, the link belt of the invention comprises a plurality of individual links and two ring packages. The first ring package serves to guide of the links. The individual links are therefore equipped with appropriately designed guidance brackets and are arranged behind the other on the first ring package. Pursuant to the invention, an additional ring package is provided, which is arranged on the outside around the link belt and is mounted on one side for example in a fixed pivot of the strip in such a way that it can no longer rotate together with the strip. Nonetheless, it can follow the strip's adjusting movement.

Since this second ring package runs no longer constantly around the variator, but only follows the motion due to changes in the gear ratio, it can be considerably more strongly designed than has been possible in the past. By contrast, the first ring package, which holds the links, can be designed accordingly weaker since the outer, standing ring package absorbs the main forces.

In order to guarantee this functionality, a bearing, via which the radial forces are transmitted from the actual link belt to the outer ring package, is provided between the actual link belt and the outer ring package.

Pursuant to the invention, the first ring package to guide the links is arranged in the center of the links, so that rollers can be accommodated between the second outer ring package and the first ring package for guiding the links. A "corrugated spring band" or a movable plastic cage can be used for example as cages for these rollers.

Pursuant to a variation of the invention, instead of the rollers a flexible "slide rail" is employed. It can consist of bearing material, preferably plastic, and covers the entire circumference.

The slide rail can be supplied with oil under pressure via the outer ring package, which is fastened in the housing, in order to ensure lubrication.

Alternatively, instead of the slide rail, a lubricating film with oil under pressure can be set up between the outer and inner ring packages.

Since the strip does not follow the ideal path, but rather deviates from it, according to the invention, a guiding sleeve is provided in the area of the actual straight stretch between the primary and secondary side as a guide. This guiding sleeve can be employed at the same time as an attachment for the fixed outer ring package in order to prevent the inner ring package from lifting off the outer ring package.

BRIEF DESCRIPTION OF THE DRAWING

The invention will now be described, by way of example, with reference to the accompanying drawings in which.

DETAILED DESCRIPTION OF THE INVENTION

Figure 1:
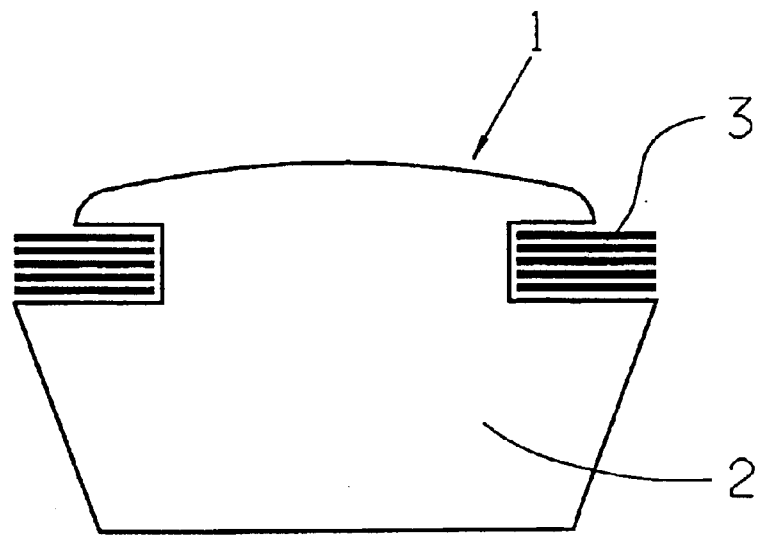
FIG. 1 represents the set-up of a link belt according to the state of the art.

In accordance with FIG. 1, according to the state of the art, a link belt 1 consists of individual links 2, which serve the purpose of the actual power transmission between two cone pulley sets, which are not shown, and of ring packages 3, which have a flexible design and hold the individual links together, wherein, as already mentioned, the ring packages cannot be reinforced randomly since this would cause the entire link belt to become more rigid, which would considerably impair operation. Consequently the amount of torque that can be transmitted is upwardly limited by this compromise between rigidity and the necessary flexibility for operation.

With the design of the invention, this compromise is no longer required, since the absorption of radial forces generated on the links is separated from the actual "guidance" of the elements.

Figure 2:
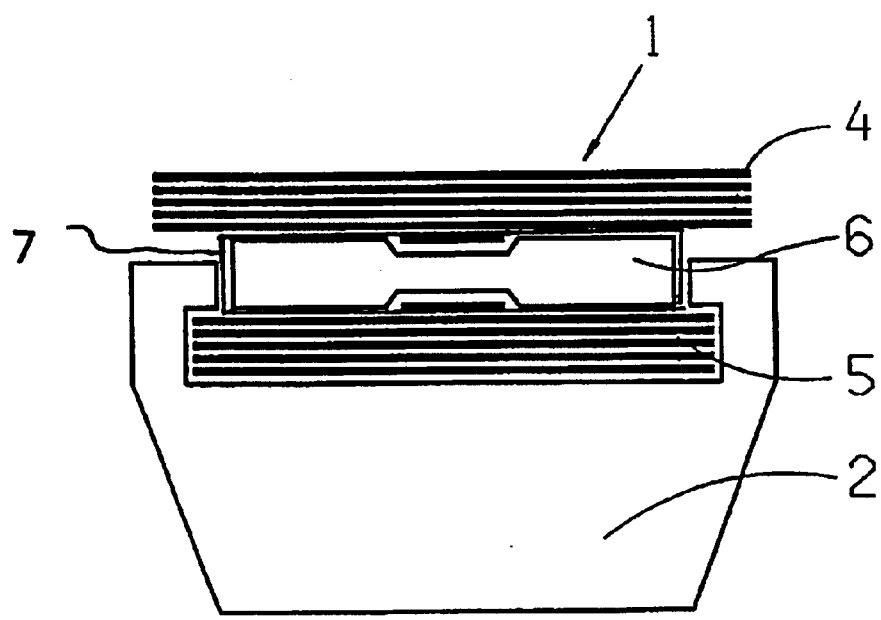
FIG. 2 represents the set-up of a link belt according to the present invention.
Figure 3:
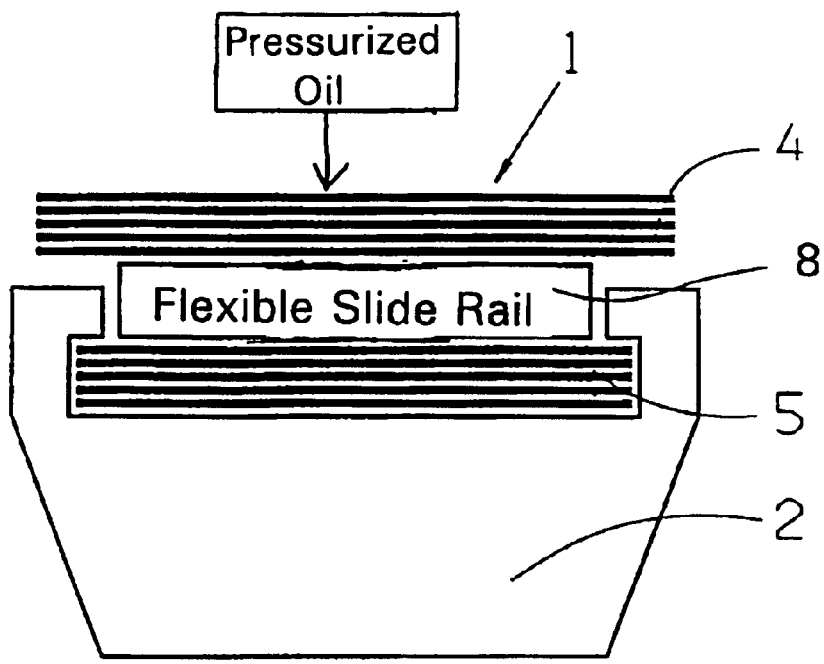
FIG. 3 is a diagrammatic cross sectional view of the link belt with flexible slide rails.
Figure 4:
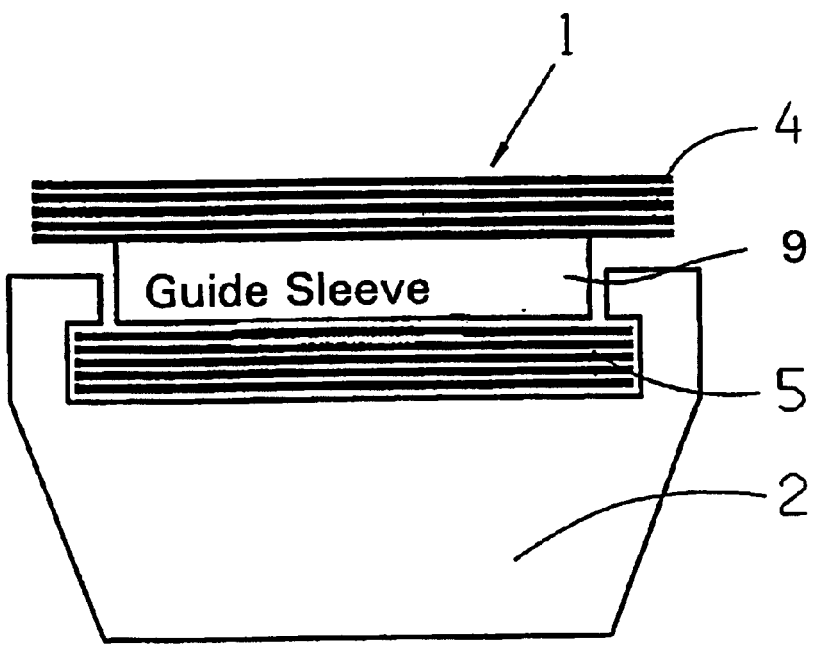
FIG. 4 is a diagrammatic cross sectional view of the link belt with a guiding sleeve.

Pursuant to FIGS. 2, 3 and 4 therefore an additional ring package 4 is provided, which is arranged on the outside around the "original" link belt 1 and is mounted and/or fixed on one side of the strip 1 in such a way that it can no longer rotate along with the strip, however is still able to follow its adjusting movement. This additional, outer ring package absorbs the radial support forces of the link belt.

Due to the construction of the invention, the additional outer ring package can be considerably more strongly designed than a conventional ring package, so that higher torque can be transmitted. By contrast, the inner ring package 5, which holds the links 2, can have a weaker design to ensure smooth operation.

In order to make possible this functionality, a device 6 such as a roller bearing is provided between the actual link belt and the outer ring package 4, through which the radial support forces are transmitted to the outer ring package 4.

The inner ring package 5 of the links 2 is therefore routed in the center of the links 2 so that rollers can be arranged between the outer ring package 4 and the ring package 5 of the links 2. A corrugated spring band or flexible plastic cage (only diagrammatically shown as element 7 in FIG. 2) can be used as cage for these rollers.

Another embodiment of the present invention (diagrammatically represented in FIG. 3) provides for the device to be flexible slide rails 8 instead of roller bearings. These rails are supplied with oil under pressure via the outer ring package 4, which is fastened in the housing, so as to ensure lubrication.

Figure 5:
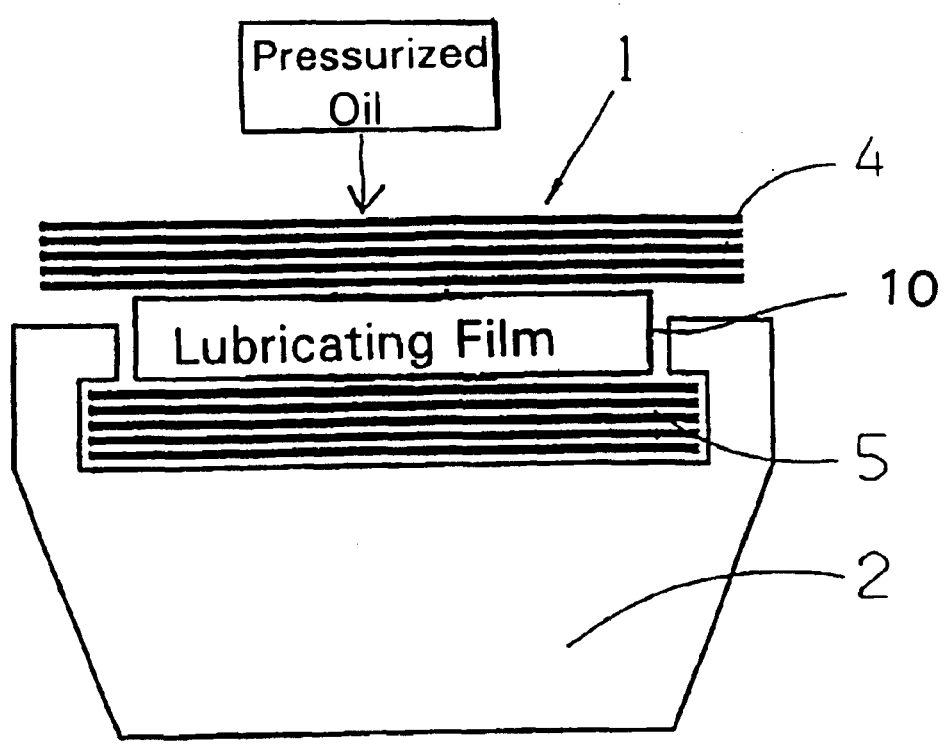
FIG. 5 is a diagrammatic cross sectional view of the link belt with a lubricating film.

For the purpose of guiding the link belt a guiding sleeve 9 (diagrammatically represented in FIG. 4) is provided, which is arranged preferably in the area of the straight path between the primary and secondary sides of the variator. This has the advantage that the guiding sleeve can also be used to fasten the outer ring package so that a lifting of the inner ring package from the outer ring package due to deviations from the ideal path is prevented. According to FIG. 5, a lubricating film 9 (only diagrammatically represented) is supplied with oil under pressure.

| Reference Numbers | |
|---|---|
| 1 | link belt |
| 2 | link |
| 3 | ring package |
| 4 | outer ring package |
| 5 | ring package |

| -continued | |
|---|---|
| Reference Numbers | |
| 6 | roller bearing |
| 7 | a corrugated spring band or flexible plastic cage |
| 8 | flexible slide rails |
| 9 | a guiding sleeve |
| 10 | a lubricating film |

What is claimed is:

1. A sliding link belt for power transmission of a continuously variable transmission, the sliding link belt comprising:

a plurality of individual links (2), an inner ring package (5) which guides and holds the plurality of individual links (2) together, and an outer ring package (4) for absorbing radial forces generated by the plurality of individual links (2), the outer ring package (4) being arranged on the outside around the sliding link belt (1) and being mounted such that the outer ring package (4) cannot rotate along with the sliding link belt (1), while still being able to follow adjusting movement of the inner ring package (5) and the plurality of individual links (2).

2. The sliding link belt according to claim 1, wherein a device (6) is provided between the plurality of individual links (2), which are held together by the inner ring package (5), and the outer ring package (4) and radial forces are transmitted to the outer ring package (4) via the device (6).

3. The sliding link belt according to claim 2, wherein the device is a roller bearing (6).

4. The sliding link belt according to claim 3, wherein the plurality of individual links (2) are positioned in a center and the roller bearing (6) is arranged between the outer ring package (4) and the inner ring package (5).

5. The sliding link belt according to claim 4, wherein one of a corrugated spring band and a flexible plastic cage is provided as a cage for the roller bearing (6).

6. The sliding link belt according to claim 2, wherein the device is a flexible slide rail which is supplied with pressurized oil via the outer ring package (4) to ensure lubrication.

7. The sliding link belt according to claim 2, wherein the device is a lubricating film supplied with pressurized oil between the outer ring package (4) and the inner ring package (5).

8. The sliding link belt according to claim 1, wherein a guiding sleeve is provided for guiding the link belt (1).

9. The sliding link belt according to claim 8, wherein the guiding sleeve is arranged in an area between primary and secondary sides of the variator.

10. The sliding link belt according to claim 8, wherein the guiding sleeve fastens the outer ring package (4) so as to prevent lifting of the inner ring package (5) from the outer ring package (4) due to deviations from an ideal rotational path.

* * * * *